United States Patent [19]

Donko

[11] 3,860,799

[45] Jan. 14, 1975

[54] CIRCUIT FOR ERGODIC PROCESSING OF PERIODIC AND APERIODIC SIGNALS

[75] Inventor: Heinz Donko, Vienna, Austria

[73] Assignee: Norma Messtechnik Gesellschaft m.b.H., Vienna, Austria

[22] Filed: Apr. 11, 1973

[21] Appl. No.: 349,928

[30] Foreign Application Priority Data

May 12, 1972 Austria .............................. 4180/72

[52] U.S. Cl................. 235/150.3, 307/271, 328/30, 328/149, 340/347 AD

[51] Int. Cl.......................... H03k 3/64, H03k 13/17

[58] Field of Search............ 235/150.3, 150.31, 156, 235/152; 340/347 AD; 331/55; 328/146–149, 38, 30; 307/271

[56] References Cited

UNITED STATES PATENTS

| | | | |
|---|---|---|---|
| 3,349,390 | 10/1967 | Glasman | 340/347 AD |
| 3,673,391 | 6/1972 | Lougheed | 235/150.3 |
| 3,675,146 | 7/1972 | Langham | 331/55 |

OTHER PUBLICATIONS

Strickland: Phase Lock Receiver, IBM Technical Disclosure Bulletin, Vol. 13, No. 7, Dec. 1970, p. 1932.

Afuso: Auslog Computation With Random Pulse Sequences, Feb. 1968, Dept. of Computer Science, Univ. of Illinois, p. 1/18.

Eisenberg: Approximation of the Pull-In Frequency of Higher Order Linear and Non Linear Loops, IEEE Transactions on Aerospace and Electronic Systems, Vol. AES-5, No. 5, Sept. 1969, p. 748–749.

*Primary Examiner*—Felix D. Gruber

*Attorney, Agent, or Firm*—Cushman, Darby & Cushman

[57] ABSTRACT

A circuit for ergodic processing periodic and aperiodic signals with an ergodic converter comprised of a threshold value controlled decision unit and a periodic threshold signal generator, a filter connected to the converter output and a regulation signal generator connected to the filter for receiving the filtered signal and to the threshold generator for causing the threshold generator to generate periodic threshold values of different frequencies to ensure statistical independence of the threshold value signal and any periodic input signal.

10 Claims, 3 Drawing Figures

CIRCUIT FOR ERGODIC PROCESSING OF PERIODIC AND APERIODIC SIGNALS

The invention relates to a circuit for the ergodic processing of aperiodic and periodic signals with at least one ergodic converter having a threshold-value controlled decision unit and a periodic threshold-value generator.

By "ergodic" is meant that the equivalence of correlation and time averages is employed in signal conversion. A binary pulse sequence $z(t)$ is associated with a signal $s(t)$ by the converter, the probability of a pulse event at a given time corresponding to that instantaneous signal value. This association is achieved by comparing the amplitude of signal $s(t)$ with a generally stochastic reference potential $r(t)$ from a threshold-value generator in a threshold-value controlled decision unit of the ergodic converter. Accordingly the pulse sequence $z(t)$ will in general be of random nature and will occur at the output of the ergodic converter. In the sense of communication theory, it is a binary electrical signal with all the advantages of binary signals, allowing control of pulse probability. Probability control by the input signal $s(t)$ of the ergodic converter is linear, provided the spectrum distribution of reference potential $r(t)$ be flat, that is, provided that each potential amplitude of $r(t)$ occur with the same relative frequency. The signals $z_i(t)$ which were transformed into binary form by the ergodic converter may be fed to an association circuit such as a correlation circuit for further processing.

The reference potential from the threshold-value generator should be of a definite amplitude-spectrum density, for instance a flat one if linear probability control of the ergodic converter by the input signal, as previously mentioned, is to be achieved. Generation of the reference potential may be achieved either by shaping a noise potential through an amplitude filter in such manner as to obtain the desired flat spectrum, this however being difficult, or periodic waveshapes with the desired amplitude spectrum may be generated in simple manner and if necessary may furthermore be frequency-modulated. The saw-tooth potential is a particularly simple reference potential with a flat spectral distribution.

When making use of a periodic reference potential, however, difficulties still will be encountered when the input signal $s(t)$ being tested is a period function with a frequency in the neighborhood of the periodic threshold-value signal forming the reference potential. This invention's object is to remedy such cases and essentially consists in the threshold-value generator being made to generate periodic threshold-value signals of various frequencies controlled by a control signal and that the latter is generated by a control-signal generator through a frequency-band limited filter immediately at the output(s) of the ergodic converter(s) for a circuit arrangement of the kind initially mentioned and so as to ensure the statistical independence of the threshold-value signal from the input signal of the ergodic converter when processing periodic input signals. On account of the automatic control or switching of the frequency of the threshold-value signal, the latter's frequency components will be incommensurable with those of the input signal, so that ergodic converter output signal will remain pure, stable and free from drift.

In one advantageous embodiment of the circuit of the invention, the regulating signal generator contains a digital counter, in particular a Modulo-N counter, which is followed by a digital-analog converter. In this manner the threshold-value generator may be switched among a multiplicity of fixed frequencies, which in this instance is preferable to shifting the threshold-value generator frequency with a trimming circuit.

Preferably the threshold-value generator is voltage-controlled in view of the repetition frequency of the threshold-value signal, the regulation signal generator providing a regulation potential for switching away the threshold-value generator repetition frequency from that of the ergodic converter input signal.

In the presence of several ergodic converters with outputs connected to an association branch, the regulation signal generator will be connected through the frequency-band limiting filter to the output of the association branch.

BRIEF DESCRIPTION OF THE DRAWINGS

The drawing illustrates schematically several embodiments of the invention. Shown are.

DETAILED DESCRIPTION

Figure 1:
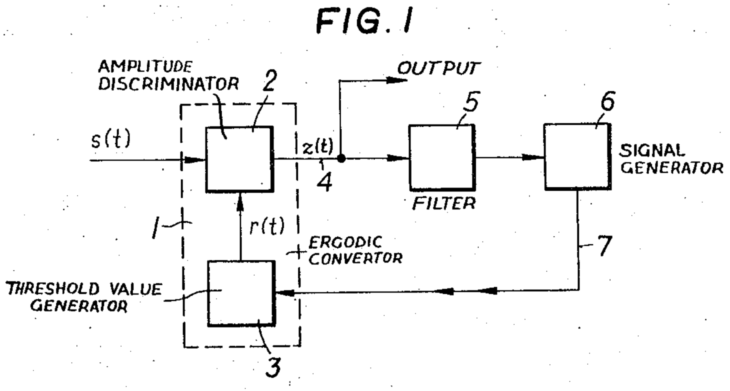
FIG. 1, the circuit in principle.

In the embodiment of FIG. 1, the ergodic converter 1 comprises an amplitude discriminator 2 in which an input signal $s(t)$ is compared with a reference signal $r(t)$ of periodic threshold-value from the threshold-value generator 3. Signal $z(t)$ at the output 4 of ergodic converter 1, obtained from the continuous amplitude comparison, is a binary signal of pulse-length modulated nature. Another kind of binary signal is better suited for further digital processing of ergodically converted signals, namely the signal obtained when the amplitude comparison between input signal and threshold-value signal is performed only at definite trigger times. The ergodic converter then provides a triggered binary pulse sequence in which the particular pulse probability corresponds to the simultaneously instantaneous input signal values.

If the frequencies of the input signal $s(t)$ and of the threshold-value signal $r(t)$ are close, drift will take place at output 4 of ergodic converter 1, and if the two frequencies coincide exactly, the output signal will be a function of the respective phases and in general, measurement will no longer be feasible. This might be remedied by manually changing the period of the threshold-value signal, but this would detract the attention of the operator from his actual task. The invention now provides automatically modifying the frequency of the threshold-value signal. To that end, a regulating signal generator 6 is connected through a frequency-band limited filter 5 to the output 4 of ergodic converter 1. A low-pass filter in general will suffice, but in special cases a band-pass may be more appropriate. A regulation signal appears at output 7 of the regulation signal generator 6, varying the frequency of threshold-value generator 3.

The output signal of ergodic converter 1 contains a mixture of frequencies arising from the non-linear association of signals $s(t)$ and $r(t)$. Relatively low frequencies are selected by filter 5 for acting on regulation signal generator 6. A continuous frequency shift of the threshold-value signal is feasible by controlling the regulation signal, but switching the operational frequency of the threshold-value generator 3 is more advantageous.

Figure 2:
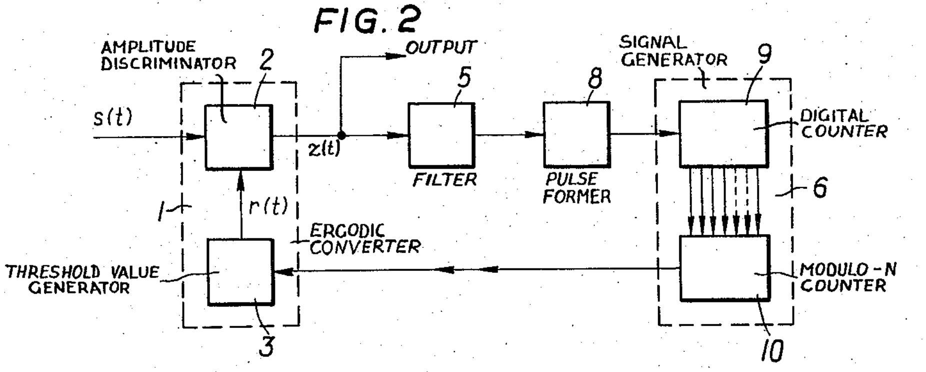
FIG. 2, an embodiment of the regulation signal generator with a digital counter.

FIG. 2 shows another technique for generating a step-wise varying regulation potential. First the signal passed by filter 5 with low frequency components is fed to a pulse-forming stage 8 which generates a signal suitable for controlling digital circuits, that is, a signal with steep slopes and even amplitudes. This signal is fed to the regulation signal generator 6 which comprises a digital counter 9 in the form of a Modulo-N counter and a digital-analog converter 10. In this manner, an abruptly changing regulation potential for controlling the fequency of the threshold-value generator 3 is achieved at output 7 of the regulation signal generator, the abruptness of change being due to the signal passed by filter 5. Interfering locking effects may be eliminated in this manner and in generaal the frequency of the threshold-value generator after one switching process will already be such as to be statistically independent of the frequency components of the input signal $s(t)$. A Schmitt multivibrator or an analog-digital converter may be used as pulse-forming stage 8. The ergodic converter may be driven in triggered synchronism or not, the regulation signal generator 6 and/or the pulse-shaping stage 8 also being amenable to triggering in the former case.

Figure 3:
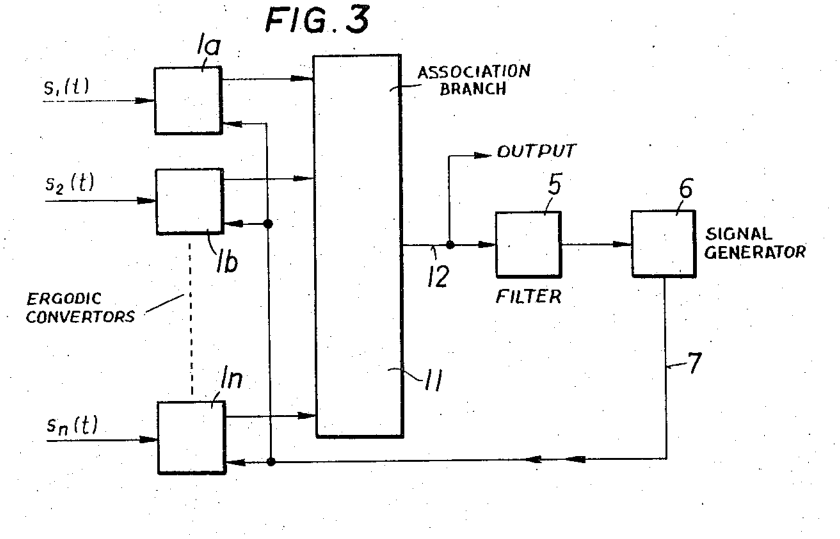
FIG. 3, a circuit with several ergodic converters the outputs of which are connected to an association branch.

FIG. 3 shows a circuit with a multiplicity of ergodic converters 1*a* through 1*n*, the outputs of which are connected to a common association branch 11. In this circuit, filter 5 and subsequent regulation signal generator 6 are connected to output 12 of association branch 11 and the regulation signal at output 7 is fed to the threshold-value generators of all ergodic converters. This allows implementing proper operation of all ergodic converters with statictical independence of the threshold-value signals from the input signals, since regulation signal gnerator 6 will respond the moment one frequency component of one of the input signals $s_1(t)$ . . . $s_n(t)$ in any of the ergodic converters 1*a* . . 1*n* will be in the immediate vicinity of the frequency of the relevant threshold-value signal.

What is claimed is:

1. A circuit for ergodic processing of periodic and aperiodic signals comprising:

at least one ergodic converter including a threshold-value controlled decision unit and a periodic threshold-value signal generator, a frequency band limited filter connected to the output of said converter, and a regulation signal generator connected to said filter for receiving the filtered signal and to said threshold-value generator for causing said threshold-value generator to generate periodic threshold-values of different frequencies to ensure statistical independence of the threshold-value signal and any periodic input signal.

2. A circuit according to claim 1, wherein said regulation signal generator comprises a digital Modulo-N counter, and subsequent digital-analog converter.

3. A circuit according to claim 2, further including a pulse-shaping stage connected between said frequency-band limiting filter and said digital counter.

4. A circuit according to claim 3, wherein said pulse-shaping stage comprises a Schmitt multivibrator.

5. A circuit according to claim 3, wherein said pulse-forming stage is an analog-digital converter.

6. A circuit according to claim 1, wherein said frequency-band limiting filter is a bandpass filter.

7. A circuit according to claim 1, wherein said frequency-band limiting filter is a low-pass filter.

8. A circuit according to claim 1, wherein the ergodic converter and the regulation signal generator are triggered.

9. A circuit according to claim 1, wherein said threshold-value generator is voltage controlled with respect to the repetition frequency of the threshold-value signal, and the regulation signal generator provides a regulation potential for switching the repetition frequency of the threshold-value generator away from that of the input signal of the ergodic converter.

10. A circuit for ergodic processing of periodic and aperiodic signals comprising:

a plurality of ergodic converters each including a threshold-value controlled decision unit and a periodic threshold-value signal generator, an association branch circuit connected to the outputs to said ergodic converters, a frequency band limited filter connected to the output of said association branch, and a regulation signal generator connected to said filter for receiving the filtered signal and to said threshold-value generator for causing said threshold-value generator to generate periodic threshold-values of different frequencies to ensure statistical independence of the threshold-value signal and any periodic input signal.

* * * * *